United States Patent
Egolf et al.

(10) Patent No.: US 7,497,422 B2
(45) Date of Patent: Mar. 3, 2009

(54) AIR SPRING AND HANGING LABEL ASSEMBLY AND METHOD OF ASSEMBLING SAME

(75) Inventors: Stephen R. Egolf, Indianapolis, IN (US); James A. Johnson, Arcadia, IN (US); Brian E. Jennings, Cicero, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/807,421

(22) Filed: May 29, 2007

(65) Prior Publication Data
US 2007/0228623 A1    Oct. 4, 2007

Related U.S. Application Data

(62) Division of application No. 11/048,281, filed on Feb. 1, 2005, now Pat. No. 7,244,324.

(51) Int. Cl.
*F16F 5/00* (2006.01)

(52) U.S. Cl. .............. 267/64.11; 267/64.16; 267/64.19; 156/71; 156/277

(58) Field of Classification Search ................ 267/113, 267/64.11, 64.14, 64.16, 64.19, 64.23, 64.27; 156/71, 228, 277, DIG. 10, DIG. 50
See application file for complete search history.

(56) References Cited

U.S. PATENT DOCUMENTS

| 2,613,462 | A | 10/1952 | Johnson |
| 4,169,326 | A | 10/1979 | Reese et al. |
| 5,381,934 | A | 1/1995 | Ueberegger |
| 5,555,655 | A | 9/1996 | Yager et al. |
| 7,244,324 | B2 * | 7/2007 | Egolf et al. .......... 156/71 |
| 2006/0043196 | A1 | 3/2006 | Trowbridge |

FOREIGN PATENT DOCUMENTS

| WO | WO 86/04175 | 7/1986 |
| WO | WO 92/11905 | 7/1992 |
| WO | WO 01/27905 A1 | 4/2001 |

\* cited by examiner

*Primary Examiner*—Pam Rodriguez
(74) *Attorney, Agent, or Firm*—Sarah M. Jabbari; Fay Sharpe LLP

(57) ABSTRACT

An air spring assembly including a first end member having a peripheral edge, a second end member in spaced relation to the first end member, and a flexible sleeve secured between the first and second end members at least partially defining a spring chamber. A label is formed from sheet material and includes a first portion coated with adhesive and a second portion spaced from the first portion that includes a plurality of indicia. The label is disposed along the first end member with the first adhesive portion secured thereto and the second portion extending outwardly beyond the peripheral edge. A method is also disclosed.

20 Claims, 4 Drawing Sheets

AIR SPRING AND HANGING LABEL ASSEMBLY AND METHOD OF ASSEMBLING SAME

This is a divisional application of U.S. patent application Ser. No. 11/048,281, filed Feb. 1, 2005, now U.S. Pat. No. 7,244,324, which is hereby incorporated herein by reference in its entirety.

BACKGROUND

The present novel concept broadly relates to the art of air spring suspension devices and, more particularly, to an air spring having an overhanging label and a method of assembling the same.

In known arrangements, identifying information of an air spring, such as manufacturer name, model number, serial number, batch or lot number, size characteristics and/or load capacity, for example, are provided on a surface of the air spring. In some cases, information is molded or otherwise formed into the flexible wall of the air spring. In most cases, however, it is more practical from a manufacturing perspective to label the air spring during or just after performing the assembly process. In either case, the manufacturer, part number, specifications and other details are important for the proper selection of a replacement air spring, as a repair technician will in many cases have limited details about the originally installed air spring.

One possibility for marking an air spring with information, such as that discussed above, would be to print the information directly on a flexible wall or end member of the air spring. Unfortunately, the ink that is printed on the air spring component or components tends not to be sufficiently durable to withstand the environmental conditions associated with the use of the air spring on a motor vehicle suspension. That is, the water, salt, dirt and other compounds and debris typically cause the printed characters to be absorbed, wash off, fade or become otherwise unreadable. Thus, potentially causing the repair technician to have to undertake additional and, often, time consuming efforts to determine the correct replacement part.

In an effort to overcome this problem, manufacturers have used paper or polymeric labels that are printed to include the information specific to each air spring. Often, these labels are usually more durable and easier to read than direct printing, and are often preprinted in bulk quantities. In other situations, the labels can be printed individually during the production run. In either case, a label printed with the information specific to the air spring being produced is provided and is applied to a surface of the air spring during or just after assembly. One disadvantage to such an arrangement, however, is that the flexible movement of the wall of the air spring is incompatible with the securement of such labels. That is, when a typical printed label is secured to the flexible wall of an air spring, the label tends to become inadvertently loosened from the flexible wall and can fall off or become otherwise lost.

As such, manufacturers commonly affix the label to one of the rigid end members of the air spring. Thus, the label will not become loosened due to flexing of the wall. However, the label, along with the information printed thereon, is disposed between two rigid components of the vehicle and is, thus, not visible. Therefore, the repair technician will normally have to remove the air spring that is to be replaced from its installed disposition on the vehicle before the information on the label is visible. This requires considerable time and effort, and additionally causes the associated vehicle to be out of service during this time. This can be particularly problematic where the repair technician does not have a suitable replacement part on hand or otherwise immediately available. This is because the proper replacement part will then need to be ordered and the vehicle will remain out of service during this time, increasing the cost and time required to make the repair.

In an effort to overcome this disadvantage, at least one manufacturer has developed a label that is secured along the flexible wall of the air spring, as shown in International Patent Publication No. WO 01/27905, for example. In this arrangement, the label is captured between the flexible wall and the peripheral portion of the end member, which is crimped or otherwise formed along the end of the flexible wall to form the air spring. This arrangement, however, provides potential leak paths along the transitions between the edges of the label and the flexible wall, which are, of course, disadvantageous and to be generally avoided.

BRIEF SUMMARY

An air spring assembly in accordance with the present novel concept is provided that includes a first end member having a peripheral edge, a second end member in spaced relation to the first end member, and a flexible sleeve secured between the first and second end members at least partially defining a spring chamber therebetween. A label formed from sheet material includes a first portion coated with an adhesive substance and a second portion spaced from the first portion that includes a plurality of indicia. The label is disposed along the first end member with the first portion adhesively secured thereto and the second portion extending outwardly beyond the peripheral edge.

Another air spring assembly in accordance with the present invention and for use on an associated vehicle having first and second spring mounting surfaces is provided. The air spring assembly includes a first end member that has a peripheral edge and is supported along the first spring mounting surface. The air spring assembly includes a second end member in spaced relation to the first end member that is supported along the second spring mounting surface, and a flexible wall that is secured between the first and second end member and at least partially defines a spring chamber therebetween. The air spring assembly also includes a label having an attachment end and a free end. The attachment end is secured between the first end member and the first spring mounting surface, and the free end extends outwardly beyond the peripheral edge of the first end member.

A method of assembling an air spring and hanging label onto an associated vehicle having associated first and second air spring mounting portions is provided, and includes a step of providing an air spring. The air spring includes a first end member having a peripheral edge, a second end member spaced from the first end member, and a flexible wall secured therebetween at least partially forming a spring chamber. Another step includes providing a label that includes a first end with a plurality of indicia formed thereon and an opposing second end. Still another step includes securing the second end of the label along the first end member such that the first end and the indicia thereon extend outwardly beyond the peripheral edge.

DETAILED DESCRIPTION

Figure 1:
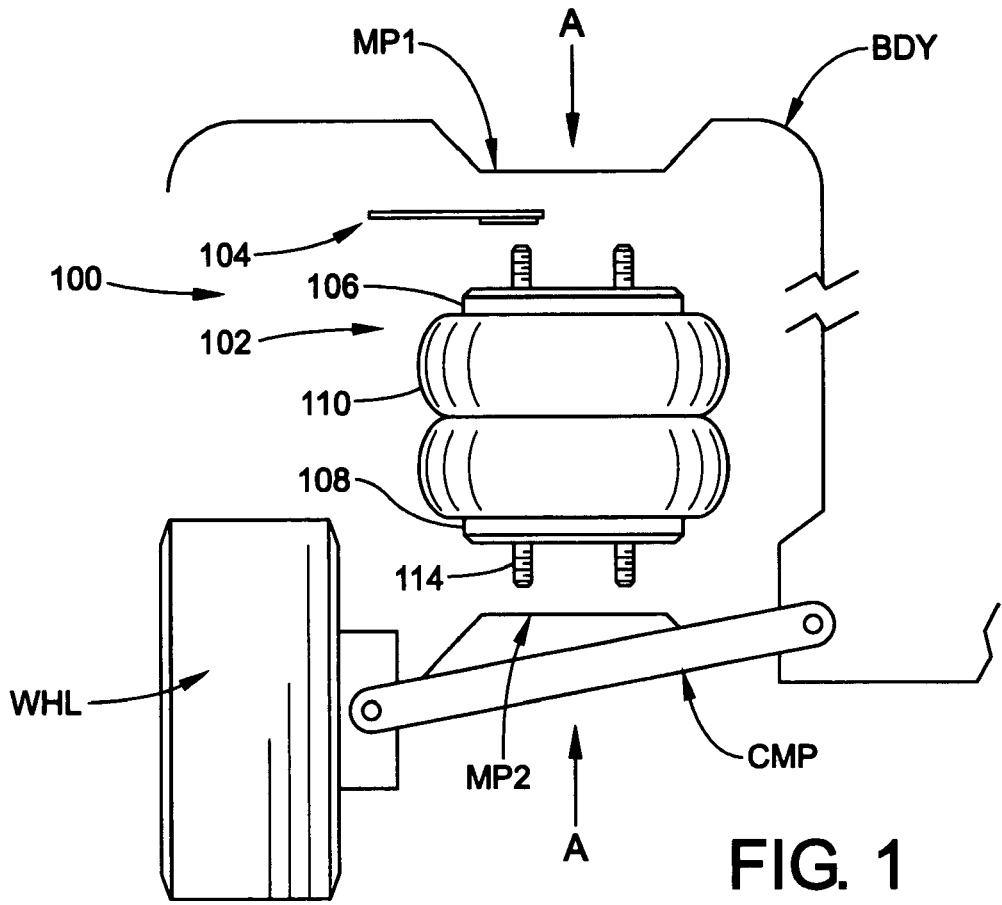
FIG. 1 is an exploded side view of one embodiment of an air spring and hanging label assembly according to the present novel concept shown in operative association with a vehicle body and suspension component.

Referring now in greater detail to the drawings, wherein the showings are for the purposes of illustrating exemplary embodiments of the subject novel concept only, and not for the purpose of limiting the same, FIG. 1 illustrates a vehicle having a vehicle body BDY and a suspension component CMP supporting a wheel WHL in a conventional manner. An air spring and hanging label assembly 100 is supported between body BDY and suspension component CMP, and includes an air spring 102 and a label 104. In a fully assembled and installed condition, assembly 100 will be secured between mounting portions MP1 and MP2 of the body and suspension component, respectively, as indicated by assembly arrows A-A. As such, at least a portion of label 104 will be captured between air spring 102 and one of the mounting portions, which is shown more specifically as being mounting portion MP1 in the exemplary embodiment of FIG. 1.

Figure 2:
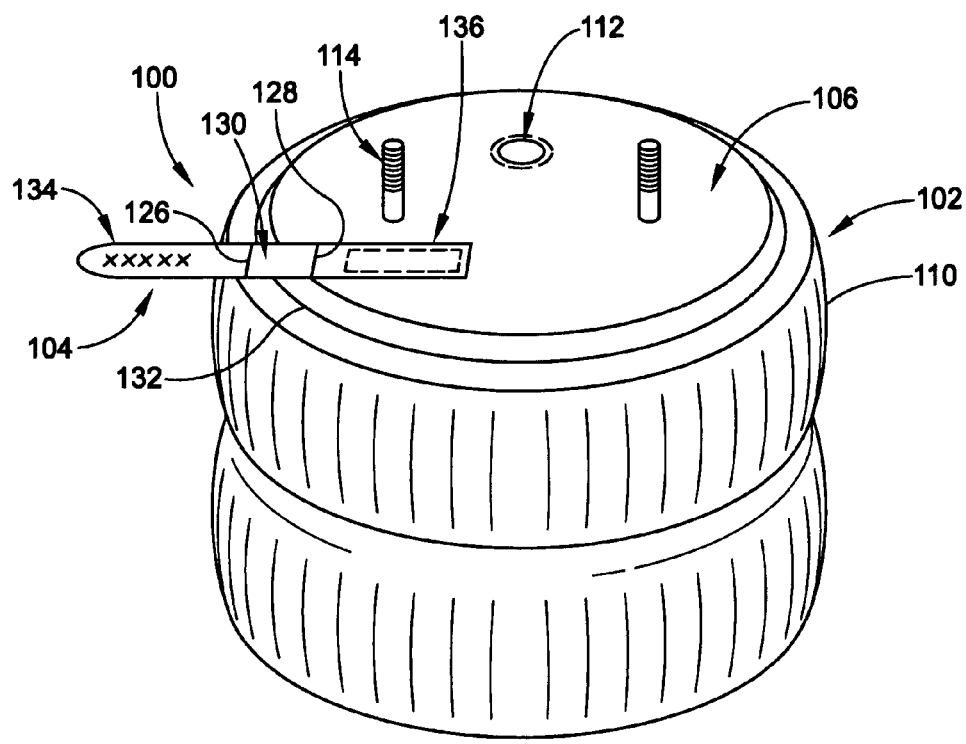
FIG. 2 is a perspective view of the air spring and hanging label assembly shown in FIG. 1.

Air spring 102 includes opposing end members 106 and 108. A flexible wall 110 is secured between end members 106 and 108, and at least partially forms a spring chamber (not shown) therebetween. As shown in FIG. 2, a fluid passage 112 is preferably provided on one of the end members for fluid communication with the spring chamber, and includes threads or other suitable features for receiving a fitting or air line. The air spring can be secured on mounting portions MP1 and MP2 in any suitable manner. For example, the end members can include mounting studs 114 that extend outwardly therefrom and which are received in corresponding mounting holes formed along the mounting portions. Nuts (not shown) or other suitable mechanical fasteners can be used to retain the mounting studs, as is well understood in the art. Alternately, threaded passages (not shown) can be provided in one of more of the end members, and mechanical fasteners (not shown) can be provided that extend through the associated mounting portions and engage the threaded passages.

Air spring 102 is shown in FIGS. 1 and 2 as being having a plurality of convolutions or bellows. However, it will be appreciated that the present novel concept is equally applicable to air springs of other constructions as well, such as piston and sleeve-type air springs, for example. Additionally, hanging label 104 is shown in FIGS. 1 and 2 as being used in operative association with the top or upper end member of the air spring. However, it will likewise be understood that the hanging label can also be on or in association with the bottom or lower end member without departing from the principles of the present novel concept.

Figure 3:
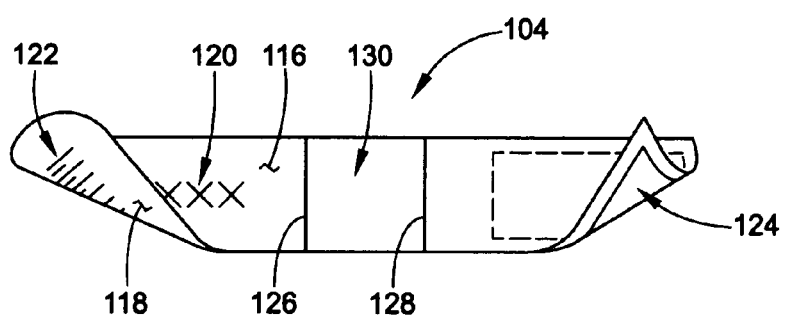
FIG. 3 is a top view of one embodiment of a label suitable for use in accordance with the present novel concept.

As shown in FIG. 3, hanging label 104 includes opposing, first and second surfaces 116 and 118. A first plurality of indicia 120 are provided on one surface, such as first surface 116, for example, and can include any type, kind and/or quantity of symbols or markings, or any combination thereof, that may be suitable for communicating the desired information, including but not limited to the specifications of the air spring with which the label will be associated. For example, the plurality of indicia can include and/or take the form of standard alphanumeric characters, bar codes and/or encrypted data or symbols, such as that that may be used for authentication purposes, for example. Additionally, a second plurality of indicia 122 can optionally be included on the opposing surface, such as second surface 118, for example. If provided, indicia 122 can be the same as or different than indicia 120. As one example, indicia 120 could include the details and specifications of the air spring printed in standard alphanumeric characters on first surface 116, with indicia 122 including similar information printed in the form of a bar code on second surface 118. As another example, indicia 120 could include the manufacturer name and part number on surface 116 and indicia 122 could include encoded data, such as lot number, batch number or other information, for example, that may be useful in detecting counterfeit products on surface 118. Based upon the foregoing examples, it will be understood that indicia, such as indicia 120 and/or 122, for example, can be included on either or both sides of the label, and can include any characters, symbols and/or combination of the same without departing from the principles of the present novel concept.

A quantity of an adhesive material 124 is shown as being disposed on second surface 118, though it will be appreciated that first surface 116 could alternately or additionally be used. It will be understood that a wide variety of suitable adhesive materials are known by those of skill in the art, that any suitable adhesive can be used, and that a suitable adhesive material can be selected by the skilled artisan depending upon any factors that may be determined to be of importance, such as the desired tenacity or strength, the label material and the end member material, for example.

Figure 4:
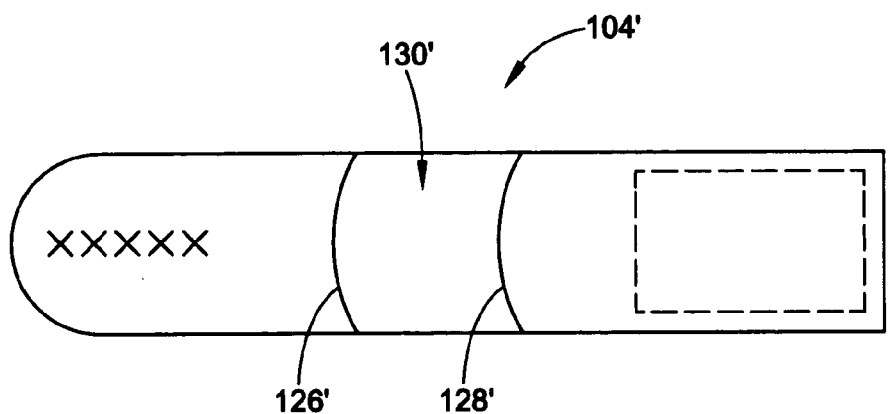
FIG. 4 is a top view of another embodiment of a label suitable for use in accordance with the present novel concept.
Figure 5:
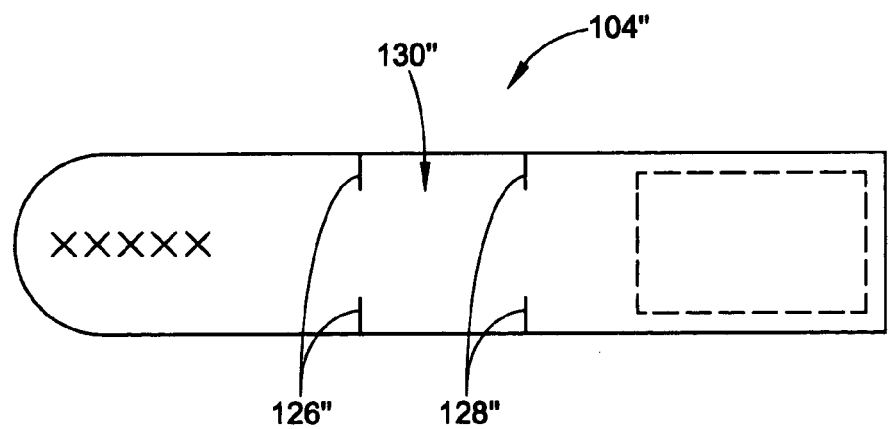
FIG. 5 is a top view of still another embodiment of a label suitable for use in accordance with the present novel concept.

Label 104 also includes index markings 126 and 128 that establish the approximate boundaries of an alignment zone 130 therebetween. Index markings 126 and 128 are shown as being substantially straight lines extending across the width of the label. However, it will be understood that the index markings can take any suitable form. For example, another embodiment of a label in accordance with the present novel concept is shown in FIG. 4 as a label 104' that includes curvilinear index markings 126' and 128' roughly defining an alignment zone 130'. Still another embodiment of a label in accordance with the present novel concept is shown in FIG. 5 as label 104" and includes index markings 126" and 128" that extend only partly across the label and suggest the approximate boundaries of an alignment zone 130". It will be appreciated that labels 104' and 104" are otherwise substantially similar to label 104, which is shown in FIGS. 1-3 and discussed above with regard thereto. Additionally, it will be understood that labels 104, 104' and 104" are merely illustrative of exemplary index markings and/or alignment zones, and that any other suitable marking or indicating feature can alternately be used.

Figure 6:
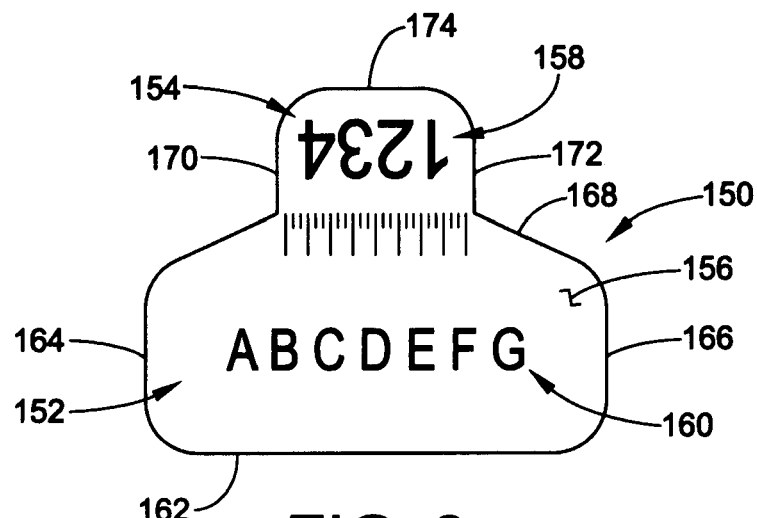
FIG. 6 is a top view of yet another embodiment of a label suitable for use in accordance with the present novel concept.

Another embodiment of a label 150 suitable for use in accordance with the present novel concept is shown in FIG. 6. Label 150 includes an attachment portion 152 and a free or overhanging portion 154 that extends from the attachment portion. A top surface 156 of label 150 is shown in FIG. 6 and includes a first plurality of indicia 158 disposed along free portion 154. Additionally, a second plurality of indicia 160 can optionally be provided along attachment portion 152. As shown in FIG. 6, indicia 158 and 160 can face in opposing directions. Furthermore, an adhesive material (not shown) is disposed along the bottom surface (not shown) of the label.

The adhesive material is preferably disposed along at least a portion of attachment portion 152, and in one exemplary embodiment is disposed along the entire bottom surface.

Attachment portion 152 of label 150 is defined by a back edge 162 and opposing side edges 164 and 166. Additionally, attachment portion has a front or alignment edge 168 generally opposite back edge 162. The alignment edge in FIG. 6 is shown as being curvilinear. However, it will be appreciated that any suitable shape can be used. Free portion 154 extends from a generally central portion of alignment edge 168 and includes opposing side edges 170 and 172 that extend between a front edge 174 of the free portion. As an alternative to using an index marking or alignment zone, as discussed above with regard to FIGS. 3-5, for example, alignment edge 168 can be used to properly position the label relative to a feature of the air spring, such as the peripheral edge of the end member, for example, to ensure that the proper overhang is provided.

In use, a label, such as label 104, 104', 104" or 150, for example, is oriented such that the adhesive material thereon, such as adhesive material 124, for example, is adjacent one of the end members of the air spring, such as end member 106, for example. Prior to adhering the label to the end member, it is preferable to aligned the label with a feature of the air spring, such as a peripheral edge 132 (FIG. 2) of end member 106, for example, to ensure that a sufficient length of the label is freely overhanging from the air spring. In this way, a free end 134 (FIG. 2) of the label can be manipulated such that the indicia thereon are fully visible. In one exemplary arrangement, the label is positioned on the end member such that an index marking, alignment zone, and/or other label feature is near, along, overlapping or otherwise adjacent the alignment feature, such as the peripheral edge of the end member of the air spring. In FIG. 2, label 104 is shown as being positioned on end member 106 such that peripheral edge 132 is within alignment zone 130 between index markings 126 and 128. It will be appreciated, however, that in other arrangement the index marking, alignment zone and/or label edge or other feature may act merely as an alignment or mounting guide. This can also depend upon the specific application as well as the length of the label and the quantity of information thereon.

Once the label has been positioned as desired, relative to the end member of the air spring, the adhesive material can be used to secure the label onto the air spring. The air spring and hanging label assembly is then installed on a vehicle suspension, such as is shown in FIG. 1, for example. Thus, a fixed end 136 (FIG. 2) of the label is therefore compressively captured between the end member of the air spring and the mounting portion of the vehicle. This securely retains the label, though the adhesive material, which was primarily used to secure the label on the air spring during production, packaging, storage, shipment and/or installation, will also assist in this regard. The opposing end 134 of the label, however, remains free and can be manipulated by a repair technician, for example, to read or otherwise ascertain the desired information about the air spring.

The label can be formed from any suitable sheet material, such as paper, coated paper, reinforced paper or plastic, for example, having any suitable thickness, such as from about 0.002 inches to about 0.015 inches, for example. In one exemplary embodiment, the label is formed from reinforced paper material, having a thickness of from about 0.003 inches to about 0.006 inches. Additionally, the adhesive material can be any suitable adhesive and can be deposited in any suitable pattern. For example, in one exemplary embodiment, the adhesive material is disposed in a generally rectangular pattern, such as is shown in FIGS. 2-5, for example. In other exemplary embodiments, the adhesive can be deposited along the entire surface of the label. Though the adhesive on a free or hanging end of the label may not be utilized for securing the label on the air spring, it may be advantageous from a manufacturing perspective to simply apply the adhesive along the entire surface or to cut the labels from stock having pre-applied adhesive, for example.

Furthermore, the indicia can be formed on the label by any suitable method, process or technique. Where the labels are produced at the time of assembly of the air spring, printing processes such as ink jet printing, laser printing or thermal printing, for example, can be used. In other situations, such as where the labels are preprinted and need only be applied to the air spring, any of the foregoing or other suitable printing method or methods can be used.

Figure 7:
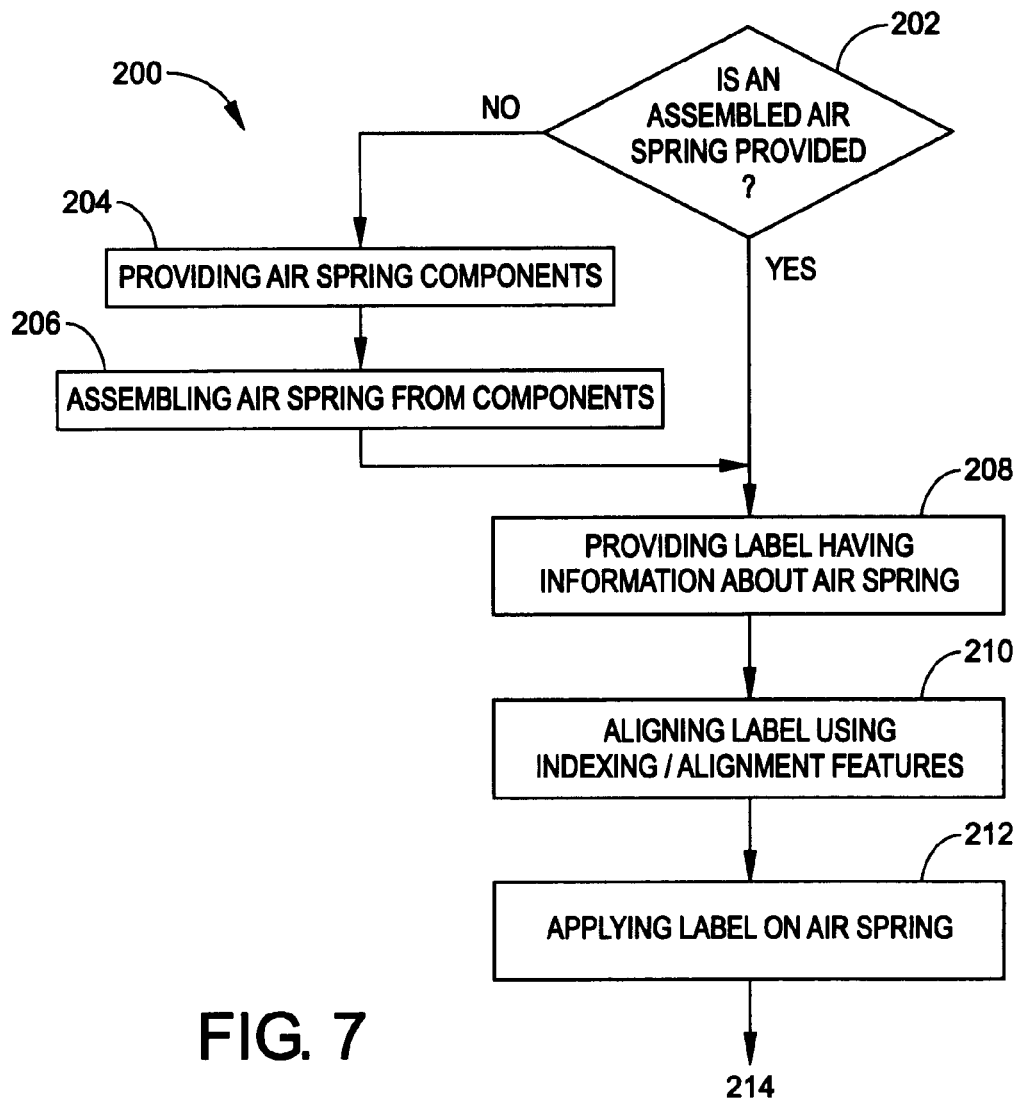
FIG. 7 is a flowchart illustrating steps of one method of assembling an air spring having a hanging label in accordance with the present novel concept.

One method 200 of assembling an air spring and hanging label assembly in accordance with the present novel concept is shown in FIG. 7. Method 200 includes an initial decision step 202 of determining whether an assembled air spring is provided for labeling. If a NO answer is determined, a step 204 can be performed that includes providing a plurality of air spring components and a step 206 can be completed that includes assembling the plurality of components into an air spring. It will be appreciated that in many situations it will be desirable to apply the label during or just after the air spring is assembled, such as along a production line, for example. Even so, other situations may exist in which a label is applied to an already assembled air spring. For example, where one or more components, such as a height, pressure or temperature sensor, for example, is added to or removed from the air spring assembly. It would likely be desirable to remove the existing label from the air spring assembly and apply a different label that accurately describes the modified air spring assembly. As such, after completion of steps 204 and 206 or, alternately, if a YES determination is made in decision step 202, another step 208 of providing a label having information about the associated air spring, such as label 104, 104' and/or 104", for example, is completed. It will be appreciated, of course, that the label can alternately be provided prior to or during assembly without departing from the principles of the present novel concept.

Having provided both the assembled air spring and the label, another step 210 includes aligning the label on an end member of the air spring using the index markings, alignment zone and/or label edges or other predetermined features. This helps to ensure that the label will sufficiently overhang the air spring for the indicia thereon to be visible without removing the air spring from the associated vehicle. Once aligned as desired, another step 212 includes applying the label in an overhanging manner to the end member of the air spring. Thereafter, the resulting air spring and label assembly can be inspected, packaged for shipment or be forwarded for further processing as indicated generally by arrow 214.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. An air spring assembly comprising:
   a first end member including an inner wall surface, an outer wall surface and a radially-outward peripheral edge;
   a second end member disposed in spaced relation to said first end member;
   a flexible sleeve secured between said first and second end members and at least partially defining a spring chamber therebetween, said flexible sleeve secured along one of said inner wall surface and said radially-outward peripheral edge such that said outer wall surface faces away from said spring chamber; and
   a label formed from sheet material and including a first portion, a second portion spaced longitudinally from said first portion, and laterally-spaced apart longitudinally-extending edges, said label including an adhesive substance disposed along at least a section of said first portion, one of an index marking, an alignment zone and an alignment edge disposed between said first and second portions, and a plurality of indicia disposed along at least a section of said second portion and spaced longitudinally from said one of an index marking, an alignment zone and an alignment edge;
   said label being oriented along said outer wall surface of said first end member with said first portion positioned radially-inwardly of said radially-outward peripheral edge and adhesively secured to said outer wall surface such that said one of an index marking, an alignment zone and an alignment edge is positioned in approximate alignment with said radially-outward peripheral edge and said second portion with said plurality of indicia is disposed outwardly beyond said radially-outward peripheral edge.

2. An air spring according to claim 1, wherein said adhesive substance is deposited along a first surface of said label and said plurality of indicia are formed on an opposing second surface of said label that faces away from said first surface.

3. An air spring according to claim 1, wherein said label includes said alignment edge, and said second portion extends from said first portion from along said alignment edge.

4. An air spring assembly according to claim 1, wherein said laterally-spaced apart longitudinally-extending edges are spaced apart a first distance along said first portion establishing a first label width and are spaced apart a second distance along said second portion establishing a second label width that is different from said first label width.

5. An air spring assembly according to claim 1, wherein said first plurality of indicia includes at least one of a plurality of alphanumeric characters, encrypted data, a symbol or a bar code.

6. An air spring comprising:
   a first end member including an inner wall surface, an outer wall surface and a radially-outward peripheral edge;
   a second end member disposed in spaced relation to said first end member;
   a flexible sleeve secured between said first and second end members and at least partially defining a spring chamber therebetween, said flexible sleeve secured along one of said inner wall surface and said radially-outward peripheral edge such that said outer wall surface faces away from said spring chamber; and
   a label formed from sheet material and including a first portion, a second portion spaced longitudinally from said first portion, a first surface, an opposing second surface facing away from said first surface, laterally-spaced apart longitudinally-extending edges, an adhesive substance deposited along at least a section of said first portion of said label along said first surface thereof, a first plurality of indicia disposed along at least a section of said second portion of said label along said second surface thereof, a second plurality of indicia formed on one of said second surface along said first portion and said first surface along said second portion, and one of an index marking, an alignment zone and an alignment edge disposed between said first and second portions, said label being oriented along said first end member with said first portion adhesively secured thereto such that said one of an index marking, an alignment zone and an alignment edge is approximately adjacent said radially-outwardly peripheral edge and said second portion extends outwardly beyond said radially-outward peripheral edge.

7. An air spring according to claim 6, wherein a first portion of said first surface is substantially entirely coated by said adhesive substance.

8. An air spring according to claim 6, wherein said one of an index marking, an alignment zone and an alignment edge is visible along only one of said opposing first and second surfaces.

9. An air spring according to claim 6, wherein said label has a width defined between at least opposing portions of said longitudinally-extending edges and includes said index marking, and said index marking includes a line extending at least partly across said width of said label.

10. An air spring assembly for use on an associated vehicle having first and second spring mounting surfaces, said air spring assembly comprising:
    a first end member including an outer surface and a peripheral edge, said first end member being supported along the first spring mounting surface;
    a second end member in spaced relation to said first end member and being supported along the second spring mounting surface;
    a flexible sleeve secured between said first and second end members, and at least partially defining a spring chamber therebetween; and,
    a label having an attachment end, a free end, a first side and an opposing second side facing away from said first side, said attachment end being secured between said first end member and the first spring mounting surface, and said free end extending outwardly beyond said peripheral edge of said first end member;
    said label including a quantity of adhesive disposed along said first side of said attachment end, a first plurality of indicia disposed along one of said first and second sides of said free end, and a second plurality of indicia disposed along one of the other of said first and second sides of said free end and said second side of said attachment end;
    said label secured along said outer surface of said first end member such that said quantity of adhesive on said first side attaches to said outer surface of said first end member with said free end disposed radially-outwardly beyond said outer peripheral edge of said first end member and freely supported therefrom such that said first plurality of indicia on said free end are spaced away from said first end member.

11. An air spring assembly according to claim 10, wherein said label includes at least one of an index marking, an alignment zone and an alignment edge disposed between said attachment end and said free end such that at least said first plurality of indicia is disposed outwardly along said free end beyond said at least one of an index marking, an alignment zone and an alignment edge.

12. An air spring assembly according to claim 11, wherein said label includes said index marking and said index marking includes a line extending at least partly across said label.

13. An air spring assembly according to claim 11, wherein said label is oriented on said first end member such that one of said index marking and said alignment zone is adjacent said peripheral edge of said first end member.

14. An air spring assembly according to claim 11, wherein said label includes an alignment edge having a curvilinear shape.

15. An air spring assembly according to claim 14, wherein said label is positioned on said first end member such that said peripheral edge and said alignment edge are adjacent one another.

16. An air spring assembly according to claim 10, wherein said attachment end is compressively secured between the first spring mounting surface and said outer surface of said first end member.

17. A gas spring assembly for securement between associated first and second structural components that are disposed in spaced relation to one another, said gas spring assembly comprising:
   a first end member disposed toward the associated first structural component, said first end member including an inner surface, an outer surface and outer peripheral wall portion;
   a second end member disposed toward the associated second structural component and in spaced relation to said first end member;
   a flexible wall secured between said first and second end members and at least partially defining a spring chamber therebetween, said flexible wall secured in abutting engagement with said first end member along said inner surface thereof such that said outer surface is disposed outwardly from said spring chamber; and,
   a label including a first end, an opposing second end, a first side and an opposing second side;
   said label including a first plurality of indicia disposed along one of said first and second sides of said first end, a second plurality of indicia disposed along the other of said first and second sides from that of said first plurality of indicia, and a quantity of adhesive disposed along said first side of said second end;
   said label disposed along said outer surface of said first end member such that said quantity of adhesive on said first side attaches to said outer surface of said first end member with said first end disposed outwardly beyond said outer peripheral wall portion of said first end member and freely supported therefrom such that said first plurality of indicia on said first end are spaced away from said first end member and visibly exposed.

18. A gas spring assembly according to claim 17, wherein said label includes one of an index marking, an alignment zone and an alignment edge disposed between said first and second ends and operative to provide a visual reference for positioning said label relative to said outer peripheral wall portion of said first end member.

19. A gas spring assembly according to claim 18, wherein said label includes said index marking, and said index marking includes at least one line extending at least partially across a width of said label.

20. A gas spring assembly according to claim 17, wherein said first plurality of indicia includes at least one of a plurality of alphanumeric characters, encrypted data, a symbol or a bar code.

* * * * *